US006369138B2

(12) United States Patent
Hergenrother et al.

(10) Patent No.: US 6,369,138 B2
(45) Date of Patent: *Apr. 9, 2002

(54) PROCESSABILITY OF SILICA-FILLED RUBBER STOCKS WITH REDUCED HYSTERESIS

(75) Inventors: William L. Hergenrother, Akron; William M. Cole, Clinton, both of OH (US)

(73) Assignee: Bridgestone Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/893,875

(22) Filed: Jul. 11, 1997

(51) Int. Cl.[7] ............................................. C08K 5/1535
(52) U.S. Cl. ..................... 524/111; 524/211; 524/216; 524/310; 524/311; 524/317; 524/318; 524/449; 524/493; 525/332.6
(58) Field of Search ................................ 524/311, 111, 524/310, 317, 318, 211, 216, 449, 493; 525/332.6

(56) References Cited

U.S. PATENT DOCUMENTS

| | | | |
|---|---|---|---|
| 3,627,723 A | * 12/1971 | Kealy et al. | 524/111 |
| 3,717,600 A | * 2/1973 | Dalhuisen et al. | 252/309 |
| 3,737,334 A | * 6/1973 | Doran et al. | 106/288 Q |
| 3,768,537 A | 10/1973 | Hess et al. | |
| 3,873,489 A | 3/1975 | Thurn | |
| 3,881,536 A | 5/1975 | Doran, Jr. et al. | |
| 3,884,285 A | 5/1975 | Russel et al. | |
| 3,923,712 A | * 12/1975 | Vickery | 106/296 X |
| 3,938,574 A | 2/1976 | Burmester et al. | |
| 3,978,103 A | 8/1976 | Meyer-Simon et al. | |
| 4,029,513 A | 6/1977 | Vessey et al. | 106/288 B |
| 4,076,550 A | 2/1978 | Thurn et al. | |
| 4,143,027 A | 3/1979 | Sollman et al. | |
| 4,179,537 A | 12/1979 | Rykowski | |
| 4,201,698 A | 5/1980 | Itoh et al. | |
| 4,229,333 A | 10/1980 | Wolff et al. | |
| 4,297,145 A | 10/1981 | Wolff et al. | |
| 4,431,755 A | 2/1984 | Weber et al. | |
| 4,433,013 A | 2/1984 | Pühringer | |
| 4,436,847 A | * 3/1984 | Wagner | 523/203 |
| 4,463,123 A | * 7/1984 | Collins et al. | 524/274 |
| 4,474,908 A | 10/1984 | Wagner | |
| 4,482,657 A | 11/1984 | Fischer et al. | 523/334 |
| 4,623,414 A | * 11/1986 | Collins et al. | 156/307.5 |
| 4,629,758 A | * 12/1986 | Kawaguchi et al. | 524/495 |
| 4,906,680 A | * 3/1990 | Umeda et al. | 524/183 |

(List continued on next page.)

FOREIGN PATENT DOCUMENTS

| | | |
|---|---|---|
| CA | 2177095 | 5/1996 |
| CA | 2184932 | 3/1997 |
| CA | 2242310 | 1/1999 |
| CA | 2242383 | 1/1999 |
| CA | 2242783 | 1/1999 |
| CA | 2242800 | 1/1999 |
| CA | 2242801 | 1/1999 |
| CA | 2243091 | 1/1999 |
| CA | 2424797 | 1/1999 |
| CH | 299373 | 8/1954 |
| DE | 29 05 977 A | 8/1979 |
| DE | 43 08 311 A | 8/1979 |
| EP | 0 299 074 | 1/1989 |
| EP | 0 447 066 | 9/1991 |
| EP | 0 510 410 | 10/1992 |
| EP | 0 641 824 | 3/1995 |
| EP | 0 677 548 A1 | 7/1995 |
| EP | 0 744 437 A1 | 4/1996 |
| EP | 0 721 971 A1 | 7/1996 |
| EP | 0 754 710 | 1/1997 |
| EP | 0 761 734 | 3/1997 |
| EP | 0 765 904 | 4/1997 |
| EP | 0 767 179 | 4/1997 |
| EP | 0 795 577 A1 | 9/1997 |
| EP | 0 824131 | 2/1998 |
| EP | 0 864605 | 9/1998 |
| EP | 0 890 580 | 1/1999 |
| EP | 0 890 587 | 1/1999 |
| EP | 0 890 588 | 1/1999 |
| EP | 0 890 602 | 1/1999 |
| EP | 0 890 603 | 1/1999 |
| EP | 0 890 606 | 1/1999 |
| EP | 0 908 586 | 1/1999 |
| JP | 63-213536 | 9/1988 |
| JP | 1-110999 | 4/1989 |
| JP | 5-51484 | 3/1993 |
| JP | 94106340 | 4/1994 |
| JP | 6-248116 | 9/1994 |
| JP | 7118452 | 5/1995 |
| JP | 7292162 A | 11/1995 |
| JP | 8269294 | 10/1996 |
| JP | 8337688 | 12/1996 |
| JP | 9087427 | 3/1997 |

*Primary Examiner*—Judy M. Reddick
(74) *Attorney, Agent, or Firm*—Meredith E. Palmer; Barbara Arndt

(57) ABSTRACT

A processable rubber stock is produced by the preparation of a silica-filled, vulcanized elastomeric compound comprising mixing an elastomer with an amorphous silica filler, a processing aid comprising fatty acid ester of a polyol, optionally an additional mineral filler, and a cure agent. The elastomer is preferably a diene monomer homopolymer or a copolymer of at least one diene and at least one monovinyl aromatic monomer. By effecting vulcanization, a vulcanized elastomeric compound is produced containing good physical properties for use as tread stock for a pneumatic tire.

4 Claims, 1 Drawing Sheet

U.S. PATENT DOCUMENTS

| | | |
|---|---|---|
| 4,937,104 A | 6/1990 | Pühringer |
| 5,057,601 A | 10/1991 | Schiessl et al. |
| 5,066,721 A | 11/1991 | Hamada et al. |
| 5,159,009 A | 10/1992 | Wolff et al. |
| 5,178,676 A | 1/1993 | Lackey et al. |
| 5,227,425 A | 7/1993 | Rauline |
| 5,227,431 A | 7/1993 | Lawson et al. ............. 525/237 |
| 5,317,051 A * | 5/1994 | Harashige et al. .......... 524/310 |
| 5,328,949 A | 7/1994 | Sandstrom et al. |
| 5,336,730 A | 8/1994 | Sandstrom et al. |
| 5,426,136 A * | 6/1995 | Waddell et al. ............. 523/200 |
| 5,502,131 A | 3/1996 | Antkowiak et al. |
| 5,508,333 A | 4/1996 | Shimizu ..................... 524/424 |
| 5,514,756 A | 5/1996 | Hsu et al. |
| 5,521,309 A | 5/1996 | Antkowiak et al. |
| 5,552,473 A | 9/1996 | Lawson et al. ............. 524/575 |
| 5,569,697 A | 10/1996 | Ferrandino et al. |
| 5,574,109 A | 11/1996 | Lawson et al. ............. 525/280 |
| 5,580,919 A | 12/1996 | Agostini et al. |
| 5,591,794 A | 1/1997 | Fukumoto et al. |
| 5,610,221 A | 3/1997 | Waddell et al. |
| 5,610,227 A | 3/1997 | Antkowski et al. |
| 5,610,237 A | 3/1997 | Lawson et al. ............. 525/280 |
| 5,616,655 A | 4/1997 | D'Sidocky et al. ......... 525/342 |
| 5,659,056 A | 8/1997 | Hergenrother et al. |
| 5,674,932 A | 10/1997 | Agostini et al. |
| 5,679,728 A | 10/1997 | Kawazura et al. |
| 5,686,523 A | 11/1997 | Chen et al. |
| 5,708,053 A | 1/1998 | Jalics et al. |
| 5,714,533 A * | 2/1998 | Hatakeyama et al. ....... 524/140 |
| 5,717,022 A * | 2/1998 | Beckmann et al. ......... 524/493 |
| 5,719,207 A | 2/1998 | Cohen et al. |
| 5,723,531 A | 3/1998 | Visel et al. |
| 5,741,858 A | 4/1998 | Brann et al. |
| 5,763,388 A | 6/1998 | Lightsey et al. |
| 5,777,013 A * | 7/1998 | Gardiner et al. ............. 524/274 |
| 5,780,537 A | 7/1998 | Smith et al. |
| 5,780,538 A * | 7/1998 | Cohen et al. ................ 524/494 |
| 5,798,419 A | 8/1998 | Ruiz Santa Quiteria et al. ............. 525/370 |
| 5,804,636 A | 9/1998 | Nahmias et al. |
| 5,804,645 A | 9/1998 | Matsuo |
| 5,866,650 A | 2/1999 | Lawson et al. |
| 5,872,171 A | 2/1999 | Detrano |
| 5,872,176 A | 2/1999 | Hergenrother et al. |
| 5,872,178 A | 2/1999 | Kansupada et al. |
| 5,872,179 A | 2/1999 | Hubbell |
| 5,877,249 A | 3/1999 | Lambotte |
| 5,883,179 A | 3/1999 | Kawazoe et al. |
| 5,886,074 A | 3/1999 | Sandstrom et al. |
| 5,886,086 A | 3/1999 | Hubbell et al. |
| 5,898,047 A | 4/1999 | Howald et al. |
| 5,912,374 A | 6/1999 | Agostini et al. |
| 5,914,364 A | 6/1999 | Cohen et al. |
| 5,916,961 A | 6/1999 | Hergenrother et al. |
| 5,916,973 A | 6/1999 | Zimmer et al. |
| 5,916,981 A | 6/1999 | Nahmias et al. |
| 6,008,295 A | 12/1999 | Takeichi et al. ............. 525/105 |

\* cited by examiner

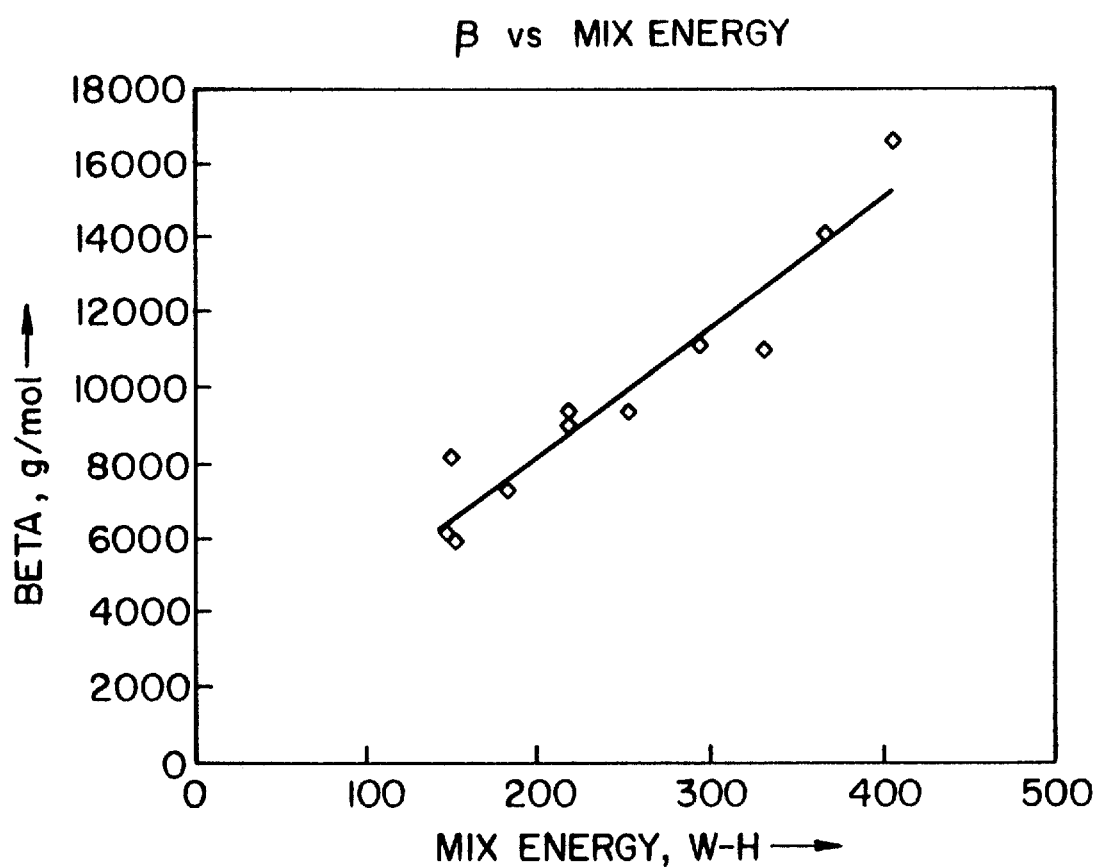

PROCESSABILITY OF SILICA-FILLED RUBBER STOCKS WITH REDUCED HYSTERESIS

TECHNICAL FIELD

The subject invention relates to the processing and vulcanization of diene polymer and copolymer elastomer containing rubber stocks. More specifically, the present invention relates to the processing and vulcanization of diene polymer and copolymer elastomer-containing, silica-filled rubber stocks using a fatty acid ester of a polyol as a processing aid.

In another embodiment, the present invention relates to the processing and vulcanization of diene polymer and copolymer elastomer-containing, silica-filled rubber stocks containing additional mineral fillers.

BACKGROUND OF THE INVENTION

In the art it is desirable to produce elastomeric compounds exhibiting reduced hysteresis when properly compounded with other ingredients such as reinforcing agents, followed by vulcanization. Such elastomers, when compounded, fabricated and vulcanized into components for constructing articles such as tires, power belts, and the like, will manifest properties of increased rebound, decreased rolling resistance and less heat-build up when subjected to mechanical stress during normal use.

The hysteresis of an elastomer refers to the difference between the energy applied to deform an article made from the elastomer and the energy released as the elastomer returns to its initial, undeformed state. In pneumatic tires, lowered hysteresis properties are associated with reduced rolling resistance and heat build-up during operation of the tire. These properties, in turn, result in lowered fuel consumption of vehicles using such tires.

In such contexts, the property of lowered hysteresis of compounded, vulcanizable elastomer compositions is particularly significant. Examples of such compounded elastomer systems are known to the art and are comprised of at least one elastomer (that is, a natural or synthetic polymer exhibiting elastomeric properties, such as a rubber), a reinforcing filler agent (such as finely divided carbon black, thermal black, or mineral fillers such as clay and the like) and a vulcanizing system such as sulfur-containing vulcanizing (that is, curing) system.

Previous attempts at preparing readily processable, vulcanizable, silica-filled rubber stocks containing natural rubber or diene polymer and copolymer elastomers have focused upon the sequence of adding ingredients during mixing (Bomal, et al., *Influence of Mixing procedures on the Properties of a Silica Reinforced Agricultural Tire Tread*, May 1992), the addition of de-agglomeration agents such as zinc methacrylate and zinc octoate, or SBR-silica coupling agents such as mercapto propyl trimethoxy silane (Hewitt, *Processing Technology of Silica Reinforced SBR, Elastomerics*, pp 33–37, March 1981), and the use of bis[3-(triethoxysilyl)propyl]tetrasulfide (Si69) processing aid (Degussa, PPG).

The use of Si69 processing aid in the formulation of silica-filled rubber stocks has been successful, but generally requires a large amount of the additive, such as 10% by weight based on the weight of silica, in order to be effective.

Precipitated silica has been increasingly used as a reinforcing particulate filler in carbon black-filled rubber components of tires and mechanical goods. Silica-loaded rubber stocks, however, exhibit relatively poor processability.

The present invention provides a fatty acid ester of a polyol for use as a processing aid for silica-filled rubber stocks, which greatly improve the processability and properties of the formulations and the resulting vulcanized product. In another embodiment, the present invention further provides additional mineral fillers for use in silica-filled elastomeric rubber stocks, improving tear strength and lowering hysteresis.

SUMMARY OF INVENTION

It is therefore an object of the present invention to provide rubber stock processing aids which improve the processability of formulations of diene polymer elastomers with silica-filler.

It is another object of the present invention to provide a method for reducing the viscosity of silica-filled elastomeric vulcanizable compounds.

It is another object of the present invention to provide a method for enhancing the processability of silica-filled elastomeric vulcanizable compounds.

It is another object of the present invention to provide vulcanizable silica-filled elastomeric compounds having enhanced physical properties, including decreased hysteresis and increased tear strength.

The foregoing objects, together with the advantages thereof over the existing art, which shall become apparent from the specification which follows, are accomplished by the invention as hereinafter described and claimed.

The present invention provides a process for the preparation of a silica-filled, vulcanized elastomeric compound comprising mixing an elastomer with an amorphous silica filler, a processing aid comprising a fatty acid ester of a polyol, and a cure agent; and, effecting vulcanization. Preferably, the elastomer is a diene monomer homopolymer or a copolymer of a diene monomer and a monovinyl aromatic monomer, and the processing aid is sorbitan monooleate.

The present invention further provides a vulcanizable silica-filled compound comprising an elastomer, a silica filler, a processing aid comprising a fatty acid ester of a polyol, and a cure agent. Preferably, the elastomer is styrene butadiene rubber, and optionally the vulcanizable compound contains natural rubber. The compound is more readily processable during mixing, due to the use of the mixture of the inventive processing aids.

In another embodiment, the present invention provides a vulcanizable silica-filled compound comprising an elastomer, a silica filler, an additional mineral filler such as talc, mica or clay, and a cure agent. Preferably, the vulcanizable compound contains a processing aid comprising a fatty acid of a polyol, such as sorbitan oleate.

The present invention further provides a pneumatic tire comprising tread stock vulcanized from the inventive vulcanizable silica-filled compound.

BRIEF DESCRIPTION OF THE DRAWING

The drawing FIGURE is a graph of Beta, an inverse measure of filler association or crosslink density, as a function of mix energy.

DETAILED DESCRIPTION OF THE PREFERRED EMBODIMENTS

In general, the present invention provides a means to reduce or eliminate the level of Si69, i.e., bis[3-

(triethoxysilyl)propyl]tetrasulfide, needed to obtain good physical properties in a cured rubber stock containing silica as a filler. In addition, the present invention further provides maintenance of the processability of the compounded stock, as measured by Mooney viscosity, at the same level as achieved with high levels of Si69. This replacement of the Si69 results in reduced cost and provides a material that is stable for storage and is easily added to rubber compounds. In addition, the use of vulcanizable elastomeric compounds according to the present invention obtains the same or better physical properties upon curing.

The present invention utilizes the presence of a fatty acid ester of a polyol as a processing aid to replace the silane Si69 to give equal processability of the vulcanizable compound, and better hot tear strength and lower hysteresis of the vulcanized rubber stock, without loss of the other measured physical properties. The processing aid, such as the preferred sorbitan monooleate, is air stable and does not decompose. The sorbitan oleate is lower cost and more storage stable than Si69, and when used with silica filled elastomers, gives similar reduction of $ML_4$, and tan δ with an increase in tear strength.

The inventive processing aids useful according to the present invention include fatty acid esters of polyols. Representative examples include the sorbitan oleates, including monooleate, dioleate, trioleate and sesquioleate, as well as sorbitan esters of laurate, palmitate and stearate fatty acids, and polyoxyethylene derivatives thereof, and other polyols and, more particularly, glycols, such as polyhydroxy compounds, and the like. Of these, sorbitan oleates are preferred, with sorbitan monooleate being most preferred.

According to the present invention, the polymerized elastomer, e.g., polybutadiene, polyisoprene and the like, and copolymers thereof with monovinyl aromatics such as styrene, alpha methyl styrene and the like, or trienes such as myrcene, is compounded to form the rubber stock. Thus, the elastomers include diene homopolymers, A, and copolymers thereof with monovinyl aromatic polymers, B. Exemplary diene homopolymers are those prepared from diolefin monomers having from 4 to about 12 carbon atoms. Exemplary vinyl aromatic polymers are those prepared from monomers having from 8 to about 20 carbon atoms. Examples of conjugated diene monomers and the like useful in the present invention include 1,3-butadiene, isoprene, 1,3-pentadiene, 2,3-dimethyl-1,3-butadiene and 1,3-hexadiene, and aromatic vinyl monomers include styrene, α-methylstyrene, p-methylstyrene, vinyltoluenes and vinylnaphthalenes. The conjugated diene monomer and aromatic vinyl monomer are normally used at the weight ratios of about 90:10 to about 55:45, preferably about 80:20 to about 65:35.

Preferred elastomers include diene homopolymers such as polybutadiene and polyisoprene and copolymers such as styrene butadiene rubber (SBR). Copolymers can comprise from about 99 to 55 percent by weight of diene units and from about 1 to about 45 percent by weight of monovinyl aromatic or triene units, totaling 100 percent. The polymers and copolymers of the present invention may have 1,2-microstructure contents ranging from about 10 to about 80 percent, with the preferred polymers or copolymers having 1,2-microstructure contents of from about 25 to 65 percent, based upon the diene content. The molecular weight of the polymer that is produced according to the present invention, is preferably such that a proton-quenched sample will exhibit a gum Mooney viscosity ($ML_4$/212° F.) of from about 2 to about 150. The copolymers are preferably random copolymers which result from simultaneous copolymerization of the monomers, as is known in the art. Also included are nonfunctionalized cis-polybutadiene, ethylene-propylene-diene monomer (EPDM), emulsion styrene butadiene rubber, and natural rubber.

Initiators known in the art such as an organolithium initiator, preferably an alkyllithium initiator, can be employed to prepare the elastomer. More particularly, the initiators used in the present invention include N-lithio-hexamethyleneimine, organolithium compounds such as n-butyllithium, tributyltin lithium, dialkylaminolithium compounds such as dimethylaminolithium, diethylaminolithium, dipropylaminolithium, dibutylaminolithium and the like, dialkylaminoalkyllithium compounds such as diethylaminopropyllithium and the like, and trialkyl stanyl lithium, wherein the alkyl group contains 1 to about 12 carbon atoms, preferably 1 to about 4 carbon atoms.

Polymerization is usually conducted in a conventional solvent for anionic polymerizations such as the various cyclic and acyclic hexanes, heptanes, octanes, pentanes, their alkylated derivatives, and mixtures thereof. Other techniques for polymerization, such as semi-batch and continuous polymerization may be employed. In order to promote randomization in copolymerization and to increase vinyl content, a coordinator may optionally be added to the polymerization ingredients. Amounts range between 0 to 90 or more equivalents per equivalent of lithium. The amount depends upon the amount of vinyl desired, the level of styrene employed and the temperature of the polymerizations, as well as the nature of the specific polar coordinator employed.

Compounds useful as coordinators are organic and include those having an oxygen or nitrogen hetero-atom and a non-bonded pair of electrons. Examples include dialkyl ethers of mono and oligo alkylene glycols; "crown" ethers; tertiary amines such as tetramethylethylene diamine (TMEDA); THF; THF oligomers; linear and cyclic oligomeric oxolanyl alkanes, such as 2-2'-di(tetrahydrofuryl) propane, di-piperidyl ethane, hexamethylphosphoramide, N-N'-dimethylpiperazine, diazabicyclooctane, diethyl ether, tributylamine and the like. Details of linear and cyclic oligomeric oxolanyl coordinators can be found in U.S. Pat. No. 4,429,091, owned by the Assignee of record, the subject matter of which is incorporated herein by reference.

Polymerization is usually begun by charging a blend of the monomer(s) and solvent to a suitable reaction vessel, followed by the addition of the coordinator and the initiator solution previously described. Alternatively, the monomer and coordinator can be added to the initiator. The procedure is carried out under anhydrous, anaerobic conditions. The reactants are heated to a temperature of from about 10° C. to about 150° C. and are agitated for about 0.1 to about 24 hours. After polymerization is complete, the product is removed from the heat and terminated in one or more ways.

To terminate the polymerization, a terminating agent, coupling agent or linking agent may be employed, all of these agents being collectively referred to herein as "terminating agents". Certain of these agents may provide the resulting polymer with a multifunctionality. That is, the polymers of the present invention, can carry at least one amine functional group as discussed hereinabove, and may also carry a second functional group selected and derived from the group consisting of terminating agents, coupling agents and linking agents.

Examples of terminating agents according to the present invention include those commonly employed in the art, including hydrogen, water, steam, an alcohol such as isopropanol, 1,3-dimethyl-2-imidazolidinone (DMI), carbodiimides, N-methylpyrrolidine, cyclic amides, cyclic ureas, isocyanates, Schiff bases, 4,4'-bis(diethylamino) benzophenone, and the like. Other useful terminating agents may include those of the structural formula $(R_1)_a ZX_b$, wherein Z is tin or silicon. It is preferred that Z is tin. $R_1$ is an alkyl having from about 1 to about 20 carbon atoms; a cycloalkyl having from about 3 to about 20 carbon atoms; an aryl having from about 6 to about 20 carbon atoms; or, an aralkyl having from about 7 to about 20 carbon atoms. For example, $R_1$ may include methyl, ethyl, n-butyl, neophyl, phenyl, cyclohexyl or the like. X is a halogen, such as chlorine or bromine, or alkoxy (—$OR_1$), "a" is from 0 to 3, and "b" is from about 1 to 4; where a+b=4. Examples of such terminating agents include tin tetrachloride, $(R_1)_3SnCl$, $(R_1)_2SnCl_2$, $R_1SnCl_3$, and $R_1SiCl_3$ as well as methyltriphenoxysilane ($MeSi(OPh)_3$).

It is preferred, when mineral fillers in addition to silica are to be used in the vulcanizable compound, that the polymer contain a silane functionality, such as residual terminal methylsilylphenoxy groups obtained by the use of a methyltriphenoxysilane terminator.

The terminating agent is added to the reaction vessel, and the vessel is agitated for about 1 to about 1000 minutes. As a result, an elastomer is produced having an even greater affinity for silica compounding materials, and hence, even further reduced hysteresis. Additional examples of terminating agents include those found in U.S. Pat. No. 4,616,069 which is herein incorporated by reference. It is to be understood that practice of the present invention is not limited solely to these terminators inasmuch as other compounds that are reactive with the polymer bound lithium moiety can be selected to provide a desired functional group.

Quenching is usually conducted by stirring the polymer and quenching agent for about 0.05 to about 2 hours at temperatures of from about 30° to 150° C. to ensure complete reaction. Polymers terminated with a functional group as discussed hereinabove, are subsequently quenched with alcohol or other quenching agent as described hereinabove.

Lastly, the solvent is removed from the polymer by conventional techniques such as drum drying, extruder drying, vacuum drying or the like, which may be combined with coagulation with water, alcohol or steam, thermal desolventization, or any other suitable method. If coagulation with water or steam is used, oven drying may be desirable.

The elastomeric polymers can be utilized as 100 parts of the rubber in the treadstock compound or, they can be blended with any conventionally employed treadstock rubber which includes natural rubber, synthetic rubber and blends thereof. Such rubbers are well known to those skilled in the art and include synthetic polyisoprene rubber, styrene/butadiene rubber (SBR), including emulsion SBR's, polybutadiene, butyl rubber, neoprene, ethylene/propylene rubber, ethylene/propylene/diene rubber (EPDM), acrylonitrile/butadiene rubber (NBR), silicone rubber, the fluoroelastomers, ethylene acrylic rubber, ethylene vinyl acetate copolymer (EVA), epichlorohydrin rubbers, chlorinated polyethylene rubbers, chlorosulfonated polyethylene rubbers, hydrogenated nitrile rubber, tetrafluoroethylene/propylene rubber and the like. When the functionalized polymers are blended with conventional rubbers, the amounts can vary widely within a range comprising about 5 to about 99 percent by weight of the total rubber. It is to be appreciated that the minimum amount will depend primarily upon the degree of reduced hysteresis that is desired.

According to the present invention, amorphous silica (silicon dioxide) is utilized as a filler for the diene polymer or copolymer elastomer-containing vulcanizable compound. Silicas are generally classed as wet-process, hydrated silicas because they are produced by a chemical reaction in water, from which they are precipitated as ultrafine, spherical particles.

These primary particles strongly associate into aggregates, which in turn combine less strongly into agglomerates. The surface area, as measured by the BET method gives the best measure of the reinforcing character of different silicas. For silicas of interest for the present invention, the surface area should be about 32 to about 400 $m^2/g$, with the range of about 100 to about 250 $m^2/g$ being preferred, and the range of about 150 to about 220 $m^2/g$ being most preferred. The pH of the silica filler is generally about 5.5 to about 7 or slightly over, preferably about 5.5 to about 6.8.

Silica can be employed in the amount of about 1 part to about 100 parts per 100 parts of polymer (phr), preferably in an amount from about 5 to about 80 phr. The useful upper range is limited by the high viscosity imparted by fillers of this type. Some of the commercially available silicas which may be used include: Hi-Sil® 215, Hi-Sil® 233, and Hi-Sil® 190, produced by PPG Industries. Also, a number of useful commercial grades of different silicas are available from De Gussa Corporation, Rhone Poulenc, and J.M. Huber Corporation.

Optionally, fillers which can be utilized according to the present invention include, but are not limited to, mineral fillers, such as clay (hydrous aluminum silicate), talc (hydrous magnesium silicate), and mica as well as non-mineral fillers such as urea. Preferred micas contain principally alumina, silica and potash, although other variants are also useful, as set forth below. The additional mineral fillers can be utilized in the amount of about 1 part to about 40 parts per 100 parts of polymer (phr), preferably in an amount from about 1 to about 20 phr.

Although the vulcanizable elastomeric compounds of the present invention are primarily silica-filled or silica-filled with additional mineral fillers, the polymers can be additionally compounded with all forms of carbon black in amounts ranging from about 2 to about 50 parts by weight, per 100 parts of rubber (phr), with about 5 to about 40 phr being preferred. The carbon blacks may include any of the commonly available, commercially-produced carbon blacks but those having a surface area (EMSA) of at least 20 $m^2/gram$ and more preferably at least 35 $m^2/gram$ up to 200 $m^2/gram$ or higher are preferred. Surface area values used in this application are those determined by ASTM test D-1765 using the cetyltrimethyl-ammonium bromide (CTAB) technique. Among the useful carbon blacks are furnace black, channel blacks and lamp blacks. More specifically, examples of the carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which may be utilized include acetylene blacks. Mixtures of two or more of the above blacks can be used in preparing the carbon black products of the invention. Typical values for surface areas of usable carbon blacks are summarized in the TABLE I hereinbelow.

TABLE I

Carbon Blacks

| ASTM Designation (D-1765-82a) | Surface Area (m²/g) (D-3765) |
|---|---|
| N-110 | 126 |
| N-220 | 111 |
| N-339 | 95 |
| N-330 | 83 |
| N-351 | 74 |
| N-550 | 42 |
| N-660 | 35 |

The carbon blacks utilized in the preparation of the rubber compounds of the invention may be in pelletized form or an unpelletized flocculent mass. Preferably, for more uniform mixing, unpelletized carbon black is preferred.

The reinforced rubber compounds can be cured in a conventional manner with known vulcanizing agents at about 0.2 to about 5 phr. For example, sulfur or peroxide-based curing systems may be employed. For a general disclosure of suitable vulcanizing agents one can refer to Kirk-Othmer, *Encyclopedia of Chemical Technology*, 3rd ed., Wiley Interscience, N.Y. 1982, Vol. 20, pp. 365–468, particularly "Vulcanization Agents and Auxiliary Materials" pp. 390–402. Vulcanizing agents can be used alone or in combination.

Vulcanizable elastomeric compositions of the invention can be prepared by compounding or mixing the elastomeric polymer with silica, optionally carbon black, the processing aid and optionally mineral fillers according to the present invention, and other conventional rubber additives including for example, plasticizers, antioxidants, curing agents and the like, using standard rubber mixing equipment and procedures.

GENERAL EXPERIMENTAL

The present invention was demonstrated by comparing tread formulations as shown in TABLE II in which 3 parts per hundred rubber (phr) Si69 (control, C-C) was replaced with 7.5 phr of either an aromatic oil (C-A) or naphthenic oil (C-B). This replacement was further compared to a stock prepared according to the present invention with 3 phr of sorbitan monooleate and 4.5 phr aromatic oil (#1).

TABLE II

Rubber Formulations to Evaluate Silica Modification and Physical Properties Obtained

| | Amount (parts per hundred rubber) | | | |
|---|---|---|---|---|
| Sample | C-A | C-B | C-C | #1 |
| Materials | | | | |
| SBR | 75 | 75 | 75 | 75 |
| Natural Rubber | 25 | 25 | 25 | 25 |
| Silica | 30 | 30 | 30 | 30 |
| Carbon Black | 35 | 35 | 35 | 35 |
| Wax | 1 | 1 | 1 | 1 |
| Stearic Acid | 1.5 | 1.5 | 1.5 | 1.5 |
| Zinc Oxide | 3 | 3 | 3 | 3 |
| Accelerators | 2 | 2 | 2 | 2 |
| Antioxidant | 0.95 | 0.95 | 0.95 | 0.95 |
| Retarder | 0.25 | 0.25 | 0.25 | 0.25 |

TABLE II-continued

Rubber Formulations to Evaluate Silica Modification and Physical Properties Obtained

| | Amount (parts per hundred rubber) | | | |
|---|---|---|---|---|
| Sample | C-A | C-B | C-C | #1 |
| Varied Materials | | | | |
| Si69 Processing Aid | 0 | 0 | 3 | 0 |
| Sulfur | 2.7 | 2.7 | 1.7 | 2.7 |
| Aromatic Oil | 7.5 | 0 | 0 | 4.5 |
| Naphthenic Oil | 15 | 22.5 | 15 | 15 |
| Sorbitan Oleate | 0 | 0 | 0 | 3 |
| Physical Properties Obtained | | | | |
| ML₄ @ 130° C. | 72 | 74 | 59 | 59 |
| M50 @ 25° C. (psi) | 271 | 295 | 236 | 241 |
| M300 @ 25° C. (psi) | 1750 | 1990 | 1970 | 1670 |
| Tensile @ 25° C. (psi) | 2380 | 2520 | 2410 | 2570 |
| % Elongation @ 25° C. | 383 | 361 | 349 | 419 |
| M200 @ 100° C. (psi) | 817 | 959 | 921 | 860 |
| Tensile @ 100° C. (psi) | 1270 | 1410 | 1300 | 1400 |
| % Elongation @ 100° C. | 280 | 266 | 256 | 290 |
| Tear Strength @ 171° C. (lb/in) | 98 | 95 | 99 | 120 |
| Tan δ @ 50° C. | 0.123 | 0.105 | 0.132 | 0.105 |

As can be seen in TABLE II, Sample #1 has better tear strength. The $ML_4$ @ 130° C. of Sample #1 has been reduced to the level of the control, C-C, and the 50° C. tan δ is lower than the Samples C-C or C-A and similar to that of Sample C-B.

A Mooney viscosity reduction of the vulcanizable compound by the sorbitan monooleate (Sor. Oleate) in a high silica containing formulation was also demonstrated with the addition of other $ML_4$ reducing co-agents, summarized in the following TABLE III.

TABLE III

Rubber Formulations to Evaluate Mooney Reduction and Test Results Thereof

| Material | Amount (parts per hundred rubber) |
|---|---|
| SBR | 75 |
| PBD | 25 |
| Silica | 80 |
| Carbon Black | 8 |
| Modifier | Variable (see below) |
| Stearic Acid | 1 |
| Naphthenic Oil | 41.25 |
| Wax | 1.5 |
| Resins | 1.5 |
| Stabilizers | 1.17 |
| Zinc Oxide | 1.7 |
| Curatives | 2.4 |
| Sulfur | 2 |

Cured at 171° C. for 20 minutes

Modifier Added (in phr) and $ML_4$/100° C.

| Sample | Si69 (phr) | Modifier 1 | phr | Modifier 2 | phr | ML₄/100° C. |
|---|---|---|---|---|---|---|
| C-D | 0 | None | 0 | None | 0 | 161 |
| C-E | 8 | None | 0 | None | 0 | 84 |
| #2 | 0.8 | Sor. Oleate | 4 | None | 0 | 129 |
| #3 | 0.8 | Sor. Oleate | 8 | None | 0 | 104 |
| C-F | 0.8 | PEG | 4 | None | 0 | 148 |
| C-G | 0.8 | PEG | 8 | None | 0 | 124 |
| C-H | 0.8 | Sorbitol | 4 | None | 0 | 146 |
| C-I | 0.8 | Sorbitol | 8 | None | 0 | 136 |
| #4 | 0 | Sor. Oleate | 4 | OTES | 3 | 73 |

TABLE III-continued

| #5  | 0   | Sor. Oleate | 4 | OTES      | 2   | 79  |
| #6  | 0   | Sor. Oleate | 4 | OTES/Talc | 3/2 | 72  |
| #7  | 0   | Sor. Oleate | 4 | OTES/Urea | 3/2 | 70  |
| C-J | 0.8 | None        | 0 | Mica      | 15  | 122 |
| #8  | 0.8 | Sor. Oleate | 4 | Mica      | 15  | 93  |
| #9  | 0.8 | Sor. Oleate | 8 | Mica      | 15  | 77  |

OTES = n-Octyltriethyoxysilane

As is demonstrated in TABLE III, the sorbitan oleate processing aid is more effective in reducing $ML_4$ at 100° C. than PEG or sorbitol (Samples C-F to C-I). The addition of a small amount of another silane like Si69 or OTES gives an even greater $ML_4$ reduction (Samples #2–5). Co-agents like urea, talc and mica also have a large effect on $ML_4$ reduction, especially when used with the sorbitan oleate (Samples #6–9). In fact, there is an effect on $ML_4$ reduction even when a low level of Si69 is used along with the sorbitan oleate and mica (compare Samples #8–9 with Sample C-J). These results clearly demonstrate the advantage of using a processing aid such as sorbitan oleate to reduce $ML_4$ in silica filled rubber stocks.

We have therefore found that mineral fillers inhibit re-agglomeration of the silica in silica-filled vulcanizable elastomer formulations, and maintain the dispersion of the silica, thereby reducing the mixing required and aiding in the processability of the compound through a diminished Mooney viscosity. This is demonstrated by the compounding of the following formulation to screen silica filled, vulcanizable elastomeric compound properties described below in TABLE IV.

TABLE IV

Screening Formulation

| Material          | Silica | Carbon Black |
|-------------------|--------|--------------|
| Polymer           | 100    | 100          |
| Silica            | 40     |              |
| Carbon Black      | 8      | 45           |
| Si-69             | 1      |              |
| Dicyclohexylamine | 1      | 1            |
| Antioxidant       | 1      | 1            |
| Stearic Acid      | 2      | 2            |
| Sulfur            | 1.4    | 1.4          |
| Accelerators      | 2.4    | 2.4          |
| Zinc Oxide        | 3      | 3            |
| Totals            | 159.8  | 155.8        |

In this basic formulation, without oil, five parts (by weight) of the silica were replaced with five parts of either Mica, Talc, or Clay and compounded with a rubber specifically terminated to interact with filler through residual terminal methylsilylphenoxy groups. The rubber had been terminated with methyltriphenoxysilane ($MeSi(OPh)_3$). Both a silica and carbon black filled stock were used as controls in these examples, as set forth in TABLE V.

TABLE V

Partial Silica Replacement with Mineral Fillers

| Sample       | C-K | #10  | #11  | #12  | C-L          |
|--------------|-----|------|------|------|--------------|
| Additive     |     | Talc | Mica | Clay | Carbon Black |
| Silica       | 40  | 35   | 35   | 35   |              |
| Carbon Black | 8   | 8    | 8    | 8    | 45           |
| Talc         |     | 5    |      |      |              |
| Mica         |     |      | 5    |      |              |
| Clay         |     |      |      | 5    |              |

The properties of the compounds and the cured stocks are presented in TABLE VI. The uncured compound $ML_{1+4}$ at 100° C. of the stocks containing talc and mica are significantly lower than the all silica control. Moreover, the minimum torque's (ML) by Monsanto Rheometer are also lower, indicative of a more processable stock. The hardness and MH of the talc and mica stocks indicate a slightly lower state of cure, although only slight differences are shown in the tensile properties.

TABLE VI

Physical Test Results
Initial Partial Silica Replacement with Mineral Fillers

| Sample | C-K | #10 | #11 | #12 | C-L |
|---|---|---|---|---|---|
| Cpd $ML_{1+4}$ 100° C. Monsanto Rheometer | 107.8 | 96.7 | 97.5 | 102.7 | 88.1 |
| ML | 9.55 | 8.06 | 8.40 | 8.78 | 6.53 |
| $TS_2$ | 3:37 | 3:42 | 3:46 | 3:39 | 1:32 |
| $TC_{90}$ | 12:39 | 10:24 | 10:31 | 10:42 | 3:17 |
| MH | 43.39 | 41.27 | 41.47 | 42.38 | 34:60 |
| Shore A | 69 | 65 | 66 | 67 | 67 |
| Pendulum Rebound 65° C. | 69.8 | 71.2 | 71.8 | 71.2 | 63.6 |
| Ring Tensile 24° C. | | | | | |
| 100% Mod. | 598 | 589 | 550 | 558 | 569 |
| Max. Stress (psi) | 2177 | 2186 | 2090 | 1885 | 2636 |
| Max. Strain (%) | 298 | 309 | 302 | 289 | 311 |
| Ring Tensile 100° C. | | | | | |
| 100% Mod. | 473 | 471 | 443 | 494 | 370 |
| Max. Stress (psi) | 1002 | 933 | 918 | 948 | 1712 |
| Max. Strain (%) | 190 | 184 | 188 | 182 | 272 |
| Ring Tear 171° C. lb/in 65° C. | 82 | 68 | 65 | 62 | 95 |
| Tan δ (@ 7% Elongation) | 0.070 | 0.063 | 0.064 | 0.074 | 0.121 |
| G', MPa | 3.131 | 3.004 | 3.041 | 3.163 | 2.752 |
| ΔG', MPa | 0.586 | 0.549 | 0.534 | 0.655 | 0.811 |
| Wet Skid | 45 | 47 | 44 | 43 | 37 |

Further testing of silica-filled vulcanizable elastomeric compounds were conducted to determine the effect of additional mineral fillers and the use of sorbitan oleate as a processing aid in the stock formulations. These examples are described in TABLES VII, VIII, X and XII, and results of the tests reported in TABLES IX, XI, XIII and XIV.

Compound properties displayed in TABLE IX indicate a lower raw compound $ML_{1+4}$ at 100° C. with lower T80, and lower minimum torque, ML indicative of an easier processing stock. Tensile properties of the cured stocks were not adversely affected by the mica or talc at these levels and neither was the hardness or state of cure. Further, hot ring tear was improved compared to the control. Rebound and Tan δ are indicative of lower rolling resistant stocks.

TABLE VII

Basic Formulation (C-M)

| | Parts |
|---|---|
| Masterbatch Material | |
| SBR | 90.75 |
| BR | 25 |
| Silica | 80 |
| Mica | Variable |
| Talc | Variable |
| Sobitan Monooleate | Variable |
| Si69, Neat | Variable |
| Carbon Black | 8 |
| Oil | 25.5 |
| Stearic Acid | 1 |

TABLE VII-continued

Basic Formulation (C-M)

| | Parts |
|---|---|
| Wax Blend | 1.5 |
| Resin | 3 |
| Final Mixing Material | |
| Masterbatch | (as above) |
| Processing Aid | 0.95 |
| Antioxonant | 0.22 |
| Zinc Oxide | 1.7 |
| Resin | 2.5 |
| Accelerators | 2.4 |
| Sulfur | Variable |

TABLE VIII

Partial Silica Replacement with Talc or Mica

| Sample | C-M | #13 | #14 | #15 | #16 | #17 |
|---|---|---|---|---|---|---|
| Silica (phr) | 80 | 78.5 | 76.4 | 72.7 | 76.6 | 73.3 |
| Talc (phr) | 0 | 2 | 5 | 10 | 0 | 0 |
| Mica (phr) | 0 | 0 | 0 | 0 | 5 | 10 |
| Accelerator (phr) | 2.4 | 2.4 | 2.4 | 2.4 | 2.4 | 2.4 |
| Sulfur (phr) | 1.6 | 1.6 | 1.6 | 1.6 | 1.6 | 1.6 |
| Si69 (phr) | 8 | 8 | 8 | 8 | 8 | 8 |

TABLE IX

Physical Test Results
Partial Replacement of Silica with Talc or Mica

| Sample | C-M | #13 | #14 | #15 | #16 | #17 |
|---|---|---|---|---|---|---|
| Mooney Viscometer | | | | | | |
| $ML_{1+4}$ (100° C.) | 82.0 | 80.3 | 77.9 | 71.0 | 76.7 | 71.7 |
| $T_{80}$ (seconds) | 44.3 | 42.9 | 34.7 | 24.5 | 33.7 | 26.5 |
| Monsanto Cure (170° C.) | | | | | | |
| ML | 12.14 | 12.04 | 11.46 | 10.37 | 11.41 | 10.47 |
| $TS_2$ | 2:31 | 2:30 | 2:29 | 2:32 | 2:37 | 2:30 |
| $TC_{90}$ | 13:52 | 13:08 | 12:11 | 11:37 | 12:22 | 11:56 |
| MH | 35.38 | 35.95 | 35.69 | 33.97 | 35.48 | 34.60 |
| Ring Tensile @ 23° C. | | | | | | |
| 100% Modulus | 281 | 294 | 335 | 323 | 319 | 315 |
| Max. Stress (psi) | 2434 | 2449 | 2601 | 2709 | 2634 | 2510 |
| Max. % Strain | 436 | 430 | 425 | 417 | 436 | 413 |
| Ring Tensile @ 100% | | | | | | |
| 100% Modulus | 314 | 258 | 283 | 253 | 274 | 305 |
| Max. Stress (psi) | 1580 | 1405 | 1447 | 1264 | 1471 | 1485 |
| Max. % Strain | 436 | 430 | 425 | 417 | 436 | 413 |
| Ring Tear Strength @ 170° C. (lb/in) | 189 | 239 | 238 | 215 | 256 | 227 |
| Pendulum Rebound 65° C. | 50.6 | 51.6 | 52.2 | 54.4 | 52.6 | 53.2 |
| Shore "A" Hardness | 66.0 | 70.0 | 69.0 | 65.0 | 65.0 | 67.0 |
| Rheometrics @ 65° C. | | | | | | |
| Tan δ @ 7% Strain | 0.1871 | 0.1825 | 0.1866 | 0.1730 | 0.1694 | 0.1740 |
| ΔG', MPa | 6.201 | 7.237 | 6.825 | 4.949 | 6.033 | 5.498 |

TABLE X lists variations in order to maintain a constant volume fraction filler in the basic formulation, TABLE VII. Among these variations were included two types of mica to replace some silica and replacement of Si69 with sorbitan monooleate and silica with a non reinforcing carbon black, N880. The mica utilized contained 16% Mg and is considered to be the mineral biotite, whereas C-3000 (available from KMG Minerals Inc, Kings Mountain, N.C.) is muscovite and contains very little magnesium. Properties for these formulations are displayed in TABLE XI.

A least squares estimate of the $ML_{1+4}$ at 100° C. and 0.8 parts Si69 was 137 in the all silica formulation. Addition of up to 15 parts mica caused a significant decrease in the observed value which was enhanced by the addition of sorbitan monooleate. There was an unexpected synergism of these additives on reduction of $ML_{1+4}$, t80, and ML. MH, tensile, and hardness, all indicative of a lower state of cure, were reduced by the sorbitan monooleate. These effects were also reflected in the tensile retraction data as well.

Adjustment of curatives compensated for the lower cure rate. Even at the lower state of cure, these stocks had lower Tan δ values indicative of lower rolling resistance and increased fuel efficiency. This is further enhanced with a tighter cure.

TABLE X

Partial Silica Replacement with Mica

| Sample | C-N | C-O | C-P | C-Q | C-R | C-S | #18 | #19 | #20 | #21 | #22 | #23 | C-T | C-U | #24 |
|---|---|---|---|---|---|---|---|---|---|---|---|---|---|---|---|
| Silica (phr) | 80 | 80 | 80 | 80 | 80 | 80 | 80 | 80 | 72.8 | 69.2 | 69.2 | 69.2 | 73.3 | 73.3 | 69.2 |
| Mica (phr) | 0 | 0 | 0 | 0 | 0 | 0 | 0 | 0 | 10 | 15 | 15 | 15 | 0 | 0 | 15 |
| Mica Type | — | — | — | — | — | — | — | — | B | B | B | M | — | — | M |
| N880 (phr) | 0 | 0 | 0 | 0 | 0 | 0 | 0 | 0 | 0 | 0 | 0 | 0 | 0 | 6.21 | 0 |
| Sorbitan Monooleate | 0 | 0 | 0 | 0 | 0 | 0 | 4 | 8 | 0 | 0 | 4 | 8 | 0 | 0 | 0 |
| Accelerator 1 (phr) | 1.6 | 1.9 | 2.2 | 2.5 | 2.2 | 2.2 | 2.2 | 2.2 | 2.2 | 2.2 | 2.5 | 2.2 | 1.6 | 1.6 | 2.2 |
| Sulfur (phr) | 1.6 | 1.5 | 1.4 | 1.3 | 1.6 | 1.2 | 1.8 | 1.8 | 1.8 | 1.8 | 1.7 | 1.9 | 1.6 | 1.6 | 1.8 |
| Si69 (phr) | 8 | 8 | 8 | 8 | 4 | 12 | 0.8 | 0.8 | 0.8 | 0.8 | 0.8 | 0 | 8 | 8 | 0.8 |
| Accelerator 2 (phr) | 0.8 | 0.8 | 0.8 | 0.8 | 0.8 | 0.8 | 0.8 | 0.8 | 0.8 | 0.8 | 0.8 | 0.8 | 0.8 | 0.8 | 0.8 |

B = BIOTITE
M = MUSCOVITE

TABLE XI

Physical Test Results
Partial Replacement of Silica with Mica

| Sample | C-N | C-O | C-P | C-Q | C-R | C-S | #18 | #19 |
|---|---|---|---|---|---|---|---|---|
| Mooney Viscometer | | | | | | | | |
| $ML_{1+4}$ @ 100° C. | 82.9 | 78.4 | 79.8 | 81.3 | 119.7 | 68.1 | 129.1 | 103.5 |
| $T_{80}$ | 38.8 | 31.3 | 34.7 | 35 | 1154 | 17 | 730 | 300 |
| Monsanto Cure @ 170° C. | | | | | | | | |
| ML | 12.81 | 12.46 | 12.08 | 12.46 | 19.82 | 10.03 | 24.59 | 19.28 |
| $TS_2$ | 2:29 | 2:29 | 2:34 | 2:31 | 2:07 | 2:18 | 2:17 | 2:39 |
| $TC_{90}$ | 13:16 | 11:36 | 9:29 | 7:37 | 17:43 | 11:03 | 17:52 | 15:24 |
| MH | 36.91 | 36.71 | 35.45 | 36.68 | 42.95 | 38.12 | 44.36 | 39.24 |
| Ring Tensile @ 23° C. | | | | | | | | |
| 100% Modulus | 362 | 327 | 343 | 351 | 294 | 390 | 236 | 191 |
| Max. Stress (psi) | 2793 | 2537 | 2798 | 2760 | 2479 | 2521 | 2216 | 1916 |
| Max. % Strain | 511 | 504 | 525 | 518 | 557 | 457 | 729 | 768 |
| Ring Tensile @ 100° C. | | | | | | | | |
| 100% Modulus | 353 | 293 | 285 | 326 | 294 | 355 | 183 | 151 |
| Max. Stress (psi) | 1555 | 1464 | 1418 | 1538 | 1470 | 1386 | 1444 | 1296 |
| Max. % Strain | 363 | 394 | 386 | 379 | 411 | 333 | 739 | 821 |
| Ring Tear @ 170° C. Strength (lb/in) | 245 | 257 | 243 | 237 | 233 | 280 | 176 | 278 |
| Pendulum Rebound 65° C. | 51.8 | 51.8 | 52.0 | 52.8 | 52.2 | 54.8 | 49.0 | 46.8 |
| Shore "A" Hardness | 72.0 | 69.0 | 70.0 | 70.0 | 72.0 | 70.0 | 68.0 | 66.0 |
| Rheometer @ 65° C. | | | | | | | | |
| Tan δ @ 7% Strain | 0.1815 | 0.1834 | 0.1904 | 0.19 | .01707 | 0.1751 | 0.1837 | 0.1935 |
| $\Delta G^1$, MPa | 8.329 | 8.247 | 8.754 | 9.227 | 9.267 | 7.488 | 9.762 | 8.351 |
| Tensile Retraction | | | | | | | | |
| $M_0$ (×10$^{-4}$), g/mol | 1.23 | 1.15 | 1.25 | 1.14 | 1.26 | 1.05 | 1.43 | 1.6 |
| Slope (×10$^{-3}$), g/mol | 3.06 | 3.07 | 3.16 | 3.09 | 3.73 | 2.86 | 4.95 | 5.63 |
| β (×10$^{-3}$), g/mol | 5.70 | 5.91 | 5.99 | 5.11 | 4.06 | 5.55 | 3.90 | 4.07 |

| Sample | #20 | #21 | #22 | #23 | C-T | C-U | #24 |
|---|---|---|---|---|---|---|---|
| Mooney Viscometer | | | | | | | |
| $ML_{1+4}$ @ 100° C. | 135.7 | 122.0 | 92.7 | 76.6 | 69.8 | 73.6 | 123.6 |
| $T_{80}$ | 1510 | 592 | 109.5 | 27.2 | 18.7 | 21.4 | 1316.6 |

TABLE XI-continued

Physical Test Results
Partial Replacement of Silica with Mica

| Monsanto Cure @ 170° C. | | | | | | | |
|---|---|---|---|---|---|---|---|
| ML | 26.83 | 23.03 | 16.46 | 13.63 | 10.03 | 10.37 | 22.59 |
| $TS_2$ | 1:53 | 1:57 | 2:30 | 3:13 | 2:27 | 2:20 | 1:49 |
| $TC_{90}$ | 18:45 | 18:24 | 13:16 | 12:10 | 12:06 | 10:49 | 18:45 |
| MH | 47.72 | 44.36 | 37.25 | 31.80 | 33.35 | 34.57 | 43.14 |
| Ring Tensile @ 23° C. | | | | | | | |
| 100% Modulus | 273 | 258 | 205 | 166 | 237 | 265 | 271 |
| Max. Stress (psi) | 2389 | 2281 | 2123 | 1559 | 2551 | 2796 | 2283 |
| Max. % Strain | 665 | 675 | 782 | 831 | 616 | 618 | 678 |
| Ring Tensile @ 100° C. | | | | | | | |
| 100% Modulus | 208 | 231 | 176 | 134 | 268 | 287 | 280 |
| Max. Stress (psi) | 1311 | 1402 | 1399 | 959 | 1392 | 1381 | 1242 |
| Max. % Strain | 585 | 584 | 745 | 826 | 433 | 414 | 530 |
| Ring Tear @ 170° C. Strength (lb/in) | 272 | 247 | 267 | 212 | 260 | 246 | 237 |
| Pendulum Rebound 65° C. | 51.8 | 53.0 | 51.4 | 47.6 | 53 | 52.8 | 51.6 |
| Shore "A" Hardness | 75.0 | 70.0 | 65.0 | 62.0 | 67.0 | 69.0 | 75.0 |
| Rheometric @ 65° C. | | | | | | | |
| Tan δ @ 7% Strain | 0.1791 | 0.1798 | 0.1819 | 0.1932 | 0.1851 | 0.1792 | 0.1701 |
| $\Delta G^1$, MPa | 9.676 | 8.826 | 7.022 | 5.185 | 5.749 | 5.656 | 10.165 |
| Tensile Retraction | | | | | | | |
| $M_0$ (×10$^{-4}$), g/mol | 1.26 | 1.29 | 1.59 | 1.87 | 1.10 | 1.10 | 1.26 |
| Slope (×10$^{-3}$), g/mol | 4.69 | 5.12 | 5.53 | 7.03 | 2.93 | 2.98 | 4.94 |
| β (×10$^{-3}$), g/mol | 3.42 | 4.35 | 5.61 | 7.95 | 6.35 | 6.72 | 4.02 |

TABLE XII describes additional variations in formulation as well as including other types of mica. The particular mica is unimportant in the $ML_4$ reduction which ranges from about 12 to 14 points at 15 parts mica per 100 rubber, shown in TABLE XIII. Nor are there significant effects of mica type on ML or t80 reductions. The mica stocks showed higher rebound and reduced tan δ values at comparable states of cure as judged from tensile properties. Hardness values indicated a lower state of cure for the mica stocks however, a change of filler type may not allow direct comparison of hardness to judge state of cure.

TABLE XII

Partial Silica Replacement with Mica Change of Cure System

| Sample | C-V | C-W | C-X | C-Y | #25 | #26 | #27 | #28 | #29 | C-Z |
|---|---|---|---|---|---|---|---|---|---|---|
| Recipe Per Previous Stock | C-P | C-P | C-P | C-P | C-P | C-P | C-P | C-P | C-P | C-P |
| ZnO (phr) | 1.70 | 2.40 | 3.00 | 3.00 | 1.70 | 1.70 | 1.70 | 3.00 | 3.00 | 1.70 |
| Stearic Acid (phr) | 1.00 | 1.00 | 1.00 | 2.00 | 1.00 | 1.00 | 1.00 | 1.00 | 1.00 | 1.00 |
| Silica (phr) | 80 | 80 | 80 | 80 | 69.2 | 69.2 | 69.2 | 69.2 | 69.2 | 80 |
| Mica Muscovite (phr) | 0 | 0 | 0 | 0 | 0 | 0 | 0 | 0 | 0 | |
| Water Ground 325 Mesh Mica Muscovite (phr) | 0 | 0 | 0 | 0 | 0 | 0 | 0 | 0 | 0 | 0 |
| C3000-SM-M (phr) Silene Treated | 0 | 0 | 0 | 0 | 0 | 0 | 15 | 15 | 15 | 0 |
| Si69/CB Mixture (1:1) (phr) | 16 | 16 | 16 | 16 | 16 | 16 | 16 | 16 | 0 (*) | 16 |
| Sulfur (phr) | 1.40 | 1.40 | 1.40 | 1.40 | 2.20 | 2.20 | 2.20 | 2.20 | 2.20 | 2.20 |

(*) Add 8.0 phr N330 Carbon Black to Compensate for that in 16.00 phr

TABLE XIII

Physical Test Results
Effect of Presence of Mica, Type of Mica and of Cure System
Variations at Constant Mixing Energy Input (238.4 w – hrs/lb)

| Sample | C-V | C-W | C-X | C-Y | #25 | #26 | #27 | #28 | #29 | C-Z |
|---|---|---|---|---|---|---|---|---|---|---|
| Mooney Viscometer | | | | | | | | | | |
| $ML_{1+4}$ 100° C. | 75.7 | 73.4 | 74.5 | 71.5 | 58.7 | 60.1 | 60.4 | 60.2 | 125.1 | 72.7 |
| $T_{80}$ | 24.1 | 22.7 | 24.1 | 22.4 | 19.7 | 15.9 | 15.6 | 14.6 | >300.6 | 26.1 |
| Monsanto Cure (170° C.) | | | | | | | | | | |
| ML | 11.6 | 11.17 | 11.36 | 10.59 | 8.94 | 8.85 | 9.38 | 8.60 | 25.86 | 10.97 |
| $TS_2$ | 2:30 | 2:31 | 2:36 | 2:42 | 2:19 | 2:21 | 2:18 | 2:27 | 2:11 | 2:12 |

TABLE XIII-continued

Physical Test Results
Effect of Presence of Mica, Type of Mica and of Cure System
Variations at Constant Mixing Energy Input (238.4 w − hrs/lb)

| Sample | C-V | C-W | C-X | C-Y | #25 | #26 | #27 | #28 | #29 | C-Z |
|---|---|---|---|---|---|---|---|---|---|---|
| TC$_{90}$ | 10:01 | 9:43 | 10:11 | 8:49 | 11:01 | 10:49 | 11:07 | 11:53 | 20:49 | 12:55 |
| MH | 37.37 | 37.08 | 37.70 | 35.43 | 39.44 | 39.16 | 40.70 | 38.43 | 48.24 | 41.52 |
| Ring Tensile @ 23° C. | | | | | | | | | | |
| 100% Modulus | 318 | 333 | 327 | 301 | 393 | 430 | 387 | 368 | 256 | 368 |
| MAX. Stress (psi) | 2809 | 3107 | 2927 | 2819 | 2604 | 2766 | 2681 | 2452 | 1886 | 2714 |
| Energy To Break (psi) | 6596 | 7435 | 7132 | 7038 | 5540 | 5977 | 5989 | 5212 | 5293 | 5399 |
| Ring Tensile @ 100° C. | | | | | | | | | | |
| 100% Modulus | 268 | 276 | 281 | 248 | 321 | 347 | 366 | 341 | 220 | 366 |
| Max. Stress (psi) | 1263 | 1631 | 1503 | 1483 | 1093 | 1255 | 1376 | 1436 | 1212 | 1811 |
| Max. % Strain | 364 | 439 | 417 | 451 | 324 | 334 | 341 | 368 | 671 | 361 |
| Ring Tear @ 170° C. Tear Strength (lb/in) | 276 | 307 | 305 | 322 | 253 | 253 | 261 | 246 | 240 | 253 |
| Pendulum Rebound 65° C. | 53.6 (*) | 53.0 (*) | 54.8 | 53.6 | 59.6 | 58.8 | 58.8 | 58.6 | 51.2 | 55.8 |
| Shore "A" Hardness | 65.0 | 67.0 | 67.0 | 68.0 | 68.0 | 68.0 | 67.0 | 68.0 | 72.0 | 70.0 |
| Rheometrics @ 65° C. | | | | | | | | | | |
| Tan δ @ 7% Strain | 0.1839 | 0.1868 | 0.1764 | 0.1855 | 0.1436 | 0.1458 | 0.1471 | 0.1480 | 0.1679 | 0.1875 |
| ΔG$^1$, MPa | 6.881 | 6.167 | 5.950 | 5.290 | 4.745 | 5.146 | 5.063 | 4.792 | 10.08 | 5.831 |

(*) SAMPLES NOT WELL MOLDED

TABLE XIV lists the results of controlled mix studies into which a known energy input was applied to a mix after the Si69 was added in the presence of mica, talc, and/or sorbitan monooleate. It has been established that β, an inverse measure of filler association or crosslink density, as determined by tensile retraction, can be increased by more mixing energy. This effect can be calculated from the slope of 33.99 g/mol mix energy, and intercept, 1349 g/mol, (FIG. 1) and applied to the mix energy supplied to the samples.

The data in TABLE XIV are sorted by increasing Si69, Mica, and Talc in that order. The Δβ value, the increase in β over that expected, increases with Si69 and the Mica and Talc level and are thusly grouped. The two exceptions are the combination of Mica (15 parts) with sorbitan monooleate (8 parts) and the sorbitan monooleate alone (8 parts) which show much higher β than expected from mix energy calculations alone.

TABLE XIV

Tensile Retraction of Controlled Energy Mixes
Energy After Si69 was Added to a 280 g Brabender

| Sample | Mr g/mol | S g/mol | S/Mr | β g/mol | Energy W/H | Si69 phr | Sulfur phr | ACC phr | MICA phr | TALC phr | SO phr | CALC β g/mol | Δβ g/mol |
|---|---|---|---|---|---|---|---|---|---|---|---|---|---|
| #23 | 16700 | 7034 | 0.421 | 7947 | 112.17 | 0 | 1.9 | 3.0 | 15 | 0 | 8 | 5161 | 2786 |
| #20 | 109.13 | 4910 | 0.450 | 2057 | 72.73 | 0.8 | 2 | 2.4 | 0 | 0 | 0 | 3820 | −1763 |
| #18 | 14270 | 4945 | 0.347 | 3899 | 106.13 | 0.8 | 1.8 | 3.0 | 0 | 0 | 4 | 4956 | −1057 |
| #30 | 16040 | 5626 | 0.351 | 4069 | 103.83 | 0.8 | 1.8 | 3.0 | 0 | 0 | 8 | 4878 | −809 |
| #19 | 11387 | 2686 | 0.236 | 5811 | 75.40 | 0.8 | 2 | 2.4 | 0 | 0 | 8 | 3912 | 1899 |
| #20 | 12630 | 4690 | 0.371 | 3415 | 101.44 | 0.8 | 1.8 | 3.0 | 10 | 0 | 0 | 4796 | −1381 |
| #31 | 12640 | 4944 | 0.391 | 4022 | 104.93 | 0.8 | 1.8 | 3.0 | 15 | 0 | 0 | 4915 | −893 |
| #24 | 12930 | 5122 | 0.396 | 4354 | 113.16 | 0.8 | 1.8 | 3.0 | 15 | 0 | 0 | 5195 | −841 |
| #22 | 15875 | 5532 | 0.348 | 5615 | 123.10 | 0.8 | 1.7 | 3.0 | 15 | 0 | 4 | 5533 | 82 |
| #17 | 10475 | 2547 | 0.243 | 5697 | 147.00 | 8 | 2.2 | 2.4 | 0 | 0 | 0 | 6345 | 648 |
| #25 | 12184 | 3247 | 0.268 | 6668 | 147.00 | 8 | 1.4 | 3.0 | 0 | 0 | 0 | 6345 | 323 |
| C-V | 10980 | 2928 | 0.267 | 6346 | 117.05 | 8 | 1.6 | 2.4 | 0 | 0 | 0 | 5327 | 1019 |
| C-U | 12304 | 3061 | 0.249 | 5702 | 93.51 | 8 | 1.6 | 2.4 | 0 | 0 | 0 | 4527 | 1175 |
| #28 | 12890 | 3010 | 0.234 | 5579 | 80.37 | 8 | 1.8 | 3.0 | 0 | 0 | 0 | 4080 | 1499 |
| C-T | 11040 | 2980 | 0.270 | 6716 | 109.72 | 8 | 1.6 | 2.4 | 0 | 0 | 0 | 5078 | 1638 |
| C-M | 12656 | 3130 | 0.247 | 6058 | 87.65 | 8 | 1.6 | 2.4 | 0 | 2 | 0 | 4328 | 1730 |
| #13 | 12398 | 3352 | 0.270 | 6835 | 88.70 | 8 | 1.6 | 2.4 | 0 | 5 | 0 | 4363 | 2472 |
| #14 | 12690 | 3443 | 0.271 | 7380 | 96.59 | 8 | 1.6 | 2.4 | 0 | 10 | 0 | 4632 | 2748 |
| #15 | 12491 | 3270 | 0.262 | 6706 | 89.88 | 8 | 1.6 | 2.4 | 5 | 0 | 0 | 4403 | 2303 |
| #16 | 12579 | 3423 | 0.272 | 7880 | 92.61 | 8 | 1.6 | 2.4 | 10 | 0 | 0 | 4496 | 3384 |
| #32 | 9111 | 3098 | 0.340 | 8289 | 147.00 | 8 | 2.2 | 2.4 | 15 | 0 | 0 | 6345 | 1944 |
| C-Z | 9299 | 3082 | 0.331 | 8309 | 147.00 | 8 | 2.2 | 2.4 | 15 | 0 | 0 | 6345 | 1964 |
| #26 | 9348 | 3155 | 0.338 | 8630 | 147.00 | 8 | 2.2 | 2.4 | 15 | 0 | 0 | 6345 | 2285 |
| #27 | 9849 | 3141 | 0.319 | 8708 | 147.00 | 8 | 2.2 | 2.4 | 15 | 0 | 0 | 6345 | 2363 |

It is therefore unexpected that Mica and Talc should decrease the filler interaction and increase $\beta$ as their levels are increased. Further, sorbitan monooleate, alone and in concert with Mica, acts to increase the observed $\beta$ and thus reduce filler interaction.

It is therefore demonstrated that the present invention provides a means for improving the processability of formulations of diene polymer elastomers with silica-filler, reducing the viscosity of silica-filled elastomeric vulcanizable compounds. It is further demonstrated that the present invention provides vulcanizable silica-filled elastomeric compounds having enhanced physical properties.

It should be appreciated that the present invention is not limited to the specific embodiments described above, but includes variations, modifications and equivalent embodiments defined by the following claims.

We claim:

1. A process for the preparation of a silica-filled, sulfur vulcanized elastomeric compound having a reduced viscosity prior to vulcanization, comprising:

mixing an elastomer, selected from the group consisting of homopolymers of a conjugated diene monomer and copolymers comprising monomer units derived from a diene monomer and a monomer unit selected from the group consisting of monovinyl aromatic monomers and triene monomers, with an amorphous silica filler, a processing aid selected from the group consisting of fatty acid esters of sorbitan and polyoxyethylene derivatives thereof, an additional filler selected from the group consisting of mica and urea, and a cure agent including sulfur; and effecting vulcanization.

2. A process as in claim 1 wherein the processing aid is selected from the group consisting of sorbitan dioleate, sorbitan monooleate, sorbitan trioleate, sorbitan sesquioleate, sorbitan laurate, sorbitan palmitate, sorbitan stearate, and polyoxyethylene derivatives thereof.

3. A process as in claim 1 wherein the processing aid is sorbitan monooleate.

4. A process as in claim 1 wherein the elastomer is styrene-butadiene rubber.

* * * * *

UNITED STATES PATENT AND TRADEMARK OFFICE
CERTIFICATE OF CORRECTION

PATENT NO.    : 6,369,138 B2
DATED         : April 9, 2002
INVENTOR(S)   : Hergenrother, William L., Cole, William M. and Oziomek, James It is certified that error appears in the above-identified patent and that said Letters Patent is hereby corrected as shown below:

<u>Title page,</u>
Item [75], after title, please correct the inventors as follows:
-- [75] Inventors:  William L. Hergenrother, Akron;
              William M. Cole, Clinton
              James Oxiomek, Cuyahoga Falls, all of OH (US) --

Signed and Sealed this

Twenty-fourth Day of September, 2002

*Attest:*

JAMES E. ROGAN
*Attesting Officer*    Director of the United States Patent and Trademark Office

UNITED STATES PATENT AND TRADEMARK OFFICE
CERTIFICATE OF CORRECTION

PATENT NO.   : 6,369,138 B2                                                                 Page 1 of 1
DATED        : April 9, 2002
INVENTOR(S)  : Hergenrother, William L., Cole, William M. and Oziomek, James It is certified that error appears in the above-identified patent and that said Letters Patent is hereby corrected as shown below:

<u>Title page,</u>
Item [75], after title, please correct the inventors as follows:
-- [75] Inventors:  William L. Hergenrother, Akron;
                    William M. Cole, Clinton
                    James Oziomek, Cuyahoga Falls, all of OH (US) --

This certificate supersedes Certificate of Correction issued September 24, 2002.

Signed and Sealed this

Thirtieth Day of September, 2003

JAMES E. ROGAN
*Director of the United States Patent and Trademark Office*